United States Patent

[11] 3,609,552

[72] Inventors John O. Limb
New Shewsbury;
Frank W. Mounts, Colts Neck, both of N.J.
[21] Appl. No. 851,639
[22] Filed Aug. 20, 1969
[45] Patented Sept. 28, 1971
[73] Assignee Bell Telephone Laboratories, Incorporated
Murray Hill, Berkeley Heights, N.J.

[54] DIFFERENTIAL PULSE CODE COMMUNICATION SYSTEM USING DIGITAL ACCUMULATION
5 Claims, 4 Drawing Figs.

[52] U.S. Cl. .......... 325/38 B, 179/15 AP
[51] Int. Cl. .......... H03k 13/22
[50] Field of Search .......... 325/38 R, 38 A, 38 B, 41, 42; 179/15 AP

[56] References Cited

OTHER REFERENCES

" IBM Technical Note" Vol. 10 04, Sept. 1967 page 370

*Primary Examiner*—Robert L. Richardson
*Attorneys*—R. J. Guenther and E. W. Adams, Jr.

ABSTRACT: A differential pulse code communication system is disclosed which digitally accumulates the difference signal in order to eliminate the matching problem inherent in prior art systems. In the transmitter the difference signals are digitally accumulated and converted to analog form for subtraction from the input signal, and at the receiver the difference signal is accumulated before it is converted to analog form to reconstruct the input signal.

INVENTORS J. O. LIMB
F. W. MOUNTS
BY Leonard U. Arnold
ATTORNEY

| | | DIGITAL WEIGHT | | | | | | | |
|---|---|---|---|---|---|---|---|---|---|
| | | −24 | −14 | −6 | −2 | +2 | +6 | +14 | +24 |
| FOUR BIT CODE FROM QUANTIZER | S | 0 | 0 | 0 | 0 | 1 | 1 | 1 | 1 |
| | C | 1 | 0 | 0 | 0 | 0 | 0 | 0 | 1 |
| | B | 1 | 1 | 0 | 0 | 0 | 0 | 1 | 1 |
| | A | 1 | 1 | 1 | 0 | 0 | 1 | 1 | 1 |

DIFFERENTIAL PULSE CODE COMMUNICATION SYSTEM USING DIGITAL ACCUMULATION

BACKGROUND OF THE INVENTION

In differential pulse code communication systems, such as that disclosed in U.S. Pat. No. 2,605,361, issued July 29, 1952, the difference between the actual value of a signal and an estimate of the signal based on its past is transmitted. The advantage gained by this technique is the removal of redundancy in the information signal before transmission. Any portion of a signal which can be predicted is considered redundant in that it does not contain information and need not be transmitted to reconstruct the signal at a distant receiver. By removing the redundancy in a signal a greater amount of information can be transmitted without quality impairment over a given transmission line at a fixed transmission rate. Differential coding permits efficient transmission of a message signal since the signal can be reconstructed at the receiver without transmitting the redundant or predicted portions.

In the above-cited patent, the estimate of the input message signal is produced at the transmitter by integrating past portions of the difference signal in a feedback path. The integrated signal is subtracted from the input signal, and the resulting difference signal is quantized and converted to a pulse code format for transmission. At the receiver, the removed portion of the original signal is effectively restored by integrating the signal after the transmitted pulse code is reconverted to analog form.

One of the major problems inherent in differential pulse code systems is that of matching the receiver apparatus to the transmitter apparatus, That is, since the original analog signal is operated on at the transmitter to produce the encoded difference signal, the reverse operation must be accurately performed at the receiver to reconstruct that signal. In a video system, for example, if the elements in the integrator circuit at the receiver are not precisely matched to those of the integrator at the transmitter, there may be differences of intensity introduced which will show up as distortion in the reconstruction signal. More importantly, if one or several of the levels produced by the code converter at the receiver is mismatched to the levels of the code converter in the transmitter, sever streaking may occur in the final picture. This match between the code converters in the transmitter and receiver of a conventional differential pulse code system is especially critical because all errors introduced in the code converters are summed and retained in the integrator circuit at the receiver. The retained error affects the signal potential in the integrator and appears as streaking in the lines of the reconstructed picture.

It is the object of the present invention to eliminate this critical matching problem in differential pulse code communication systems.

SUMMARY OF THE INVENTION

In the present invention, past portions of the difference signal in a differential pulse code communication system are given digital weights representative of their amplitude and are summed digitally by mean of an accumulator circuit. In order to complete the feedback path at the transmitter, the accumulated difference signal is converted to an analog signal and subtracted from the input message signal. At the receiver, the incoming code is weighted with a code representative of the amplitude of the difference signal. A digital accumulator circuit then sums the weighted signal before it is reconverted to an analog format.

In accordance with the above stated objective the present invention eliminates the matching problem inherent in prior art differential pulse code communication systems. In the present invention the received pulse code is accumulated before it is converted to analog form. As a result, if an error is introduced in the received signal due to mismatching of the levels of the code converters the effect is an error in only one of the reconstructed samples of the original signal. This type of error appears as comparatively unobjectionable high-frequency noise rather than as severe streaking in the reconstructed picture. As explained above, streaking occurs in the reconstructed picture because the error from the code converters is summed and retained by the integrator in the receivers of prior art systems. Consequently, since the digital accumulation in the present system occurs before conversion of the received signal to analog form a greater degree of mismatching may be tolerated in the code converters without streaking or serious impairment in the quality of the final picture. In addition, since the accumulator circuits in both the transmitter and receiver perform basic digital operations, they do not require precise elements and are therefor exceptionally easy to match.

DETAILED DESCRIPTION

Figure 1:
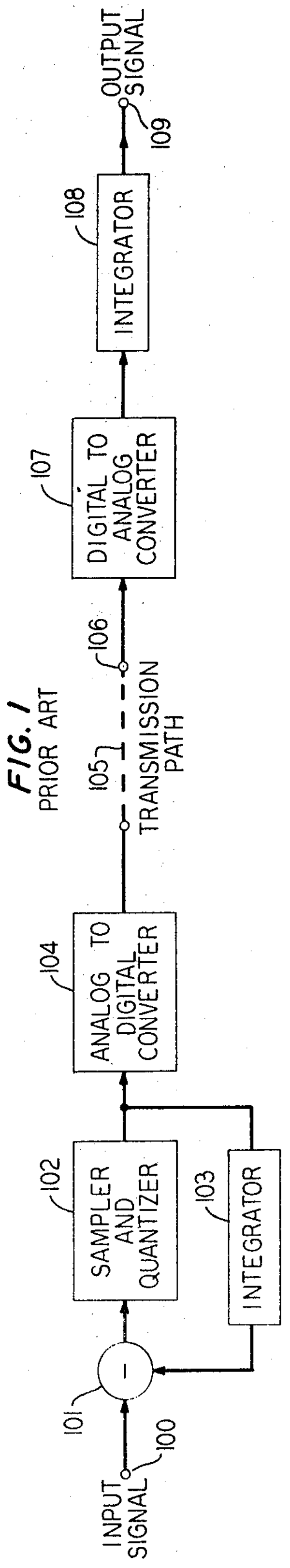
FIG. 1 is a block diagram of a differential pulse code communication system known in the prior art.

A block diagram of a differential pulse code system similar to that disclosed in U.S. Pat. No. 2,605,361 cited above is shown in FIG. 1. Its function broadly is to encode and decode differential samples of an input message signal so that the signal may be efficiently transmitted in digital form and reconstructed at a distant receiver.

An analog message signal is applied at input 100 and passed to subtractor circuit 101. The analog difference signal at the output of subtractor circuit 101 is sampled at periodic intervals and quantized into a number of discrete quantum steps in sampler and quantizer circuit 102. The quantized difference signal at the output of circuit 102 is integrated in integrator circuit 103 and fed back and subtracted from the message signal in circuit 101. The quantized signal at the output of circuit 102 is also converted to pulse code form in analog-to-digital converter 104 and transmitted via transmission path 105 to a distant receiver.

At input 106 the received signal is passed through digital-to-analog converter 107 to reconstruct the analog difference signal. Integrator circuit 108 integrates the difference signal at the output of converter circuit 107, thereby matching the function provided by integrator circuit 103 in the transmitter. The integrated signal appearing at output 109 is a reconstructed replica of the original message signal applied at input 100.

As indicated above, the critical factors for proper operation of the prior art system such as shown in FIG. 1 are the matching of integrators 103 and 108 and code converters 104 and 107. Since integrators 103 and 108 perform analog functions they require precision elements in order to insure that they perform corresponding functions in both the transmitter and receiver. Also, because of the integration of the signal in the receiver after it has passed through converter 107, all errors introduced in converter 107 have a severe effect on the reconstructed signal.

Figure 2:
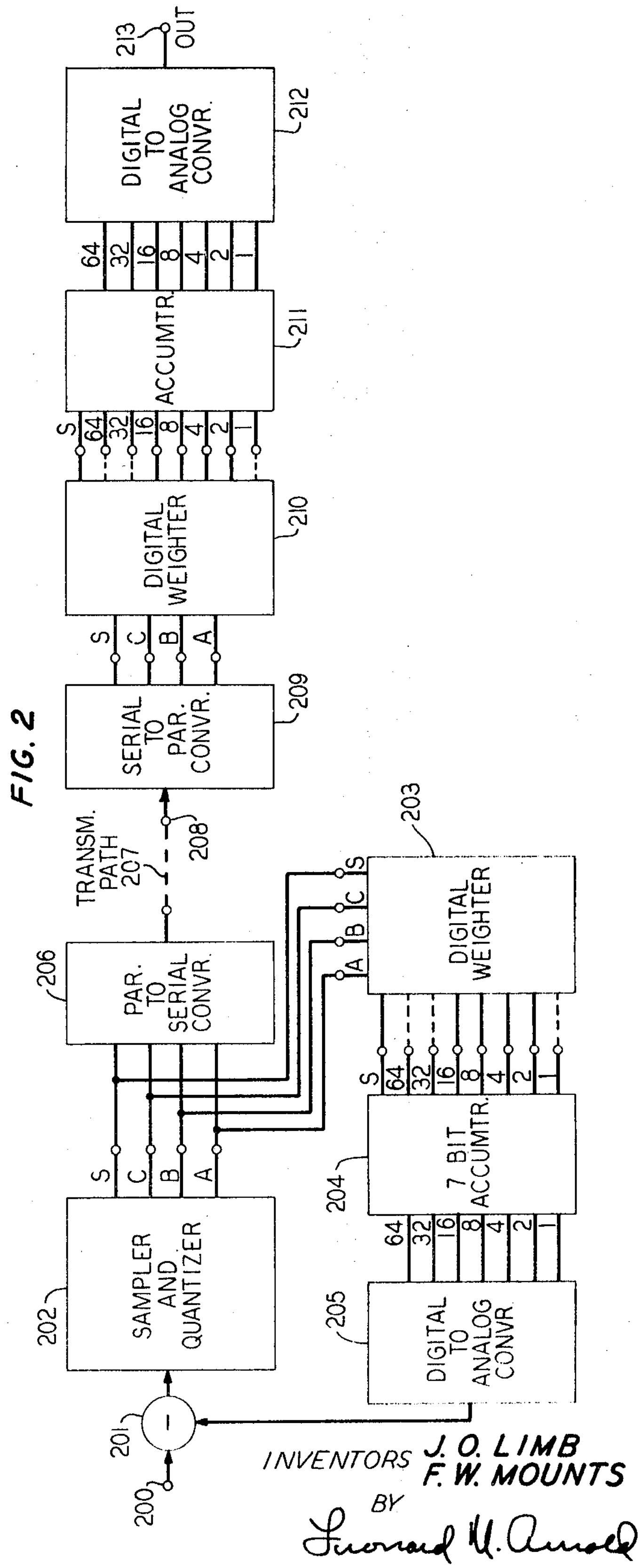
FIG. 2 is a block diagram of a differential pulse code communication system embodying the present invention.

The function of the differential pulse code communication system embodying the present invention as shown in FIG. 2 is identical to that of the prior art system shown in FIG. 1. An input message signal is applied at input 200 and passed via subtractor circuit 201 to sampler and quantizer circuit 202. In circuit 202 the difference signal at the output of subtractor circuit 201 is sampled at periodic intervals and converted to a signal having a number of discrete levels. Generally speaking, the output of quantizer circuit 202 may be in the form of a quantized sample, a continuous step signal or a pulse code appearing on a set of output leads. In FIG. 2 a four-bit signal in parallel form is produced at four outputs labeled A, B, C and S of quantizer circuit 202, rather than as the continuous step signal produced by quantizer 102 in FIG. 1. As will be appreciated from the discussion below the four-bit code may be produced in conventional quantizer circuits with techniques well known in the art.

The difference signal at the output of subtractor circuit 201 is quantized to eight levels in sampler and quantizer circuit 202, four of these levels are for the positive portions of the difference signal and four are for the negative portions of the difference signal These eight levels are indicated by the presence or absence of pulses on the four output leads labeled A, B, C and S shown in FIG. 2. The binary pulse on the output labeled S is the sign bit. That is, if the quantized signal is positive a pulse appears at the output labeled S, while if the signal is negative no pulse appears at the output labeled S. For purposes of illustration, the four quantized amplitude levels in the positive and negative portions of the difference signal are arbitrarily given amplitude units of 2, 6, 14 and 24, respectively. Thus, in total, the output of quantizer circuit 202 ranges from −24 to +24 amplitude units. If the signal is positive and has a quantized level of two, a pulse appears on the output labeled S and no pulses appear on the outputs labeled A, B and C. If the signal is positive and has a quantized amplitude of six a pulse appears simultaneously on the outputs labeled S and A. Similarly, if the signal is positive and has a quantized amplitude of either 14 or 24, pulses appear simultaneously at S, A and B or S, A, B and C. The code for the negative portion of the signal is identical to that of the positive portions of the signal except that the sign bit S is zero, indicated by the absence of a pulse on the S output lead. As may be appreciated, the pulse code appearing at the four outputs of quantizer circuit 202 may be simply produced by exciting the four output leads in succession as the input signal crosses a set of threshold levels. Such a code may be produced, for example, by adding a set of threshold circuits to the output of quantizer circuit 102 shown in FIG. 1. Then, as the output step signal varies between the quantized levels, the code pulses may be directed by the threshold circuits to appropriate output leads. Alternatively, such a code may be produced by connecting a sampler circuit directly to a set of threshold circuits. Each threshold circuit is assigned a distinct threshold level and each threshold circuit produces a pulse when the input sample exceeds that level. To produce the code above, all threshold circuits with thresholds less than the value of the input sample are triggered. Thus, for each sample amplitude a distinct set of threshold circuits are activated and a distinct pulse code is produced. The sign bit is produced simply by detecting whether the signal is positive or negative.

The four-bit code produced by sampler and quantizer circuit 202 is fed back via digital weighter circuit 203, accumulator circuit 204, and digital-to-analog converter 205 to subtractor circuit 201. As described above, each four-bit code group produced at the output of sampler and quantizer circuit 202 corresponds to one of eight quantum levels. The function of digital weighter circuit 203 is to transform the code corresponding to the quantum levels to a weighted code which represent the amplitude of each of the levels. The weighted code is then accumulated in a accumulator circuit 204 and converted to analog form in digital-to-analog circuit 205 for subtraction from the input message signal.

Figures 3, 4:
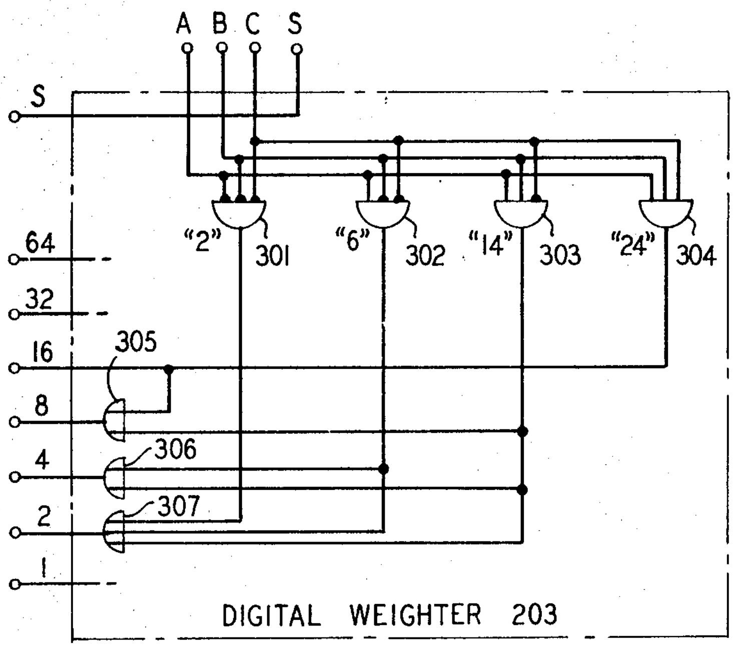
FIG. 3 is a schematic block diagram of the digital weights circuit shown in FIG. 2.
FIG. 4 is a code translation chart illustrating the weighting function performed by the digital weighter shown in FIG. 3.

A schematic block diagram of digital weighter circuit 203 is shown in FIG. 3 and a logic chart which illustrates the conversion between the codes produced by the sampler and quantizer circuit 202 and digital weighter 203 is shown in FIG. 4. Essentially, each four-bit code group from sampler and quantizer circuit 202 is transformed to a seven-bit binary code in digital weighter 203. Each seven-bit binary code at the output of digital weighter 203 represents one of the amplitudes of the eight quantum levels produced in circuit 202. In the chart shown in FIG. 4 the four-bit codes with bits S, C, B and A are shown in columns progressing from left to right and the corresponding amplitudes, or digital weights are shown on the top of each column. For each code the presence of a pulse is indicated by the numeral "1" and the absence of a pulse is indicated by the numeral "0." Thus, each column of "1*s*" and "0*s*" in FIG. 4 corresponds to one of the eight quantum levels that are produced in sampler and quantizer circuit 202. As indicated above, the codes for magnitudes 2, 6, 14 and 24 are identical for the positive and negative portions of the signal except that the sign bit, S, is a numeral "1" for positive signals and numeral "0" for negative signals.

Digital weighter 203 shown in FIG. 3 has four input leads and eight output leads. As may be seen, the sign bit on the input lead labeled S from sampler and quantizer circuit 202 passes directly through digital weighter 203 to the output lead labeled S. The remaining three inputs labeled A, B and C receive the A, B and C bits from sampler and quantizer circuit 202. As may be seen from the chart in FIG. 4, each combination of pulses at the A, B and C inputs is converted to a predetermined digital weight. In FIG. 3 this is accomplished by routing leads A, B and C through logic gates 301, 302, 303 and 304. Each of these gates selects the one of the four different code combinations that may appear at inputs A, B and C. Thus, for example, if the pulse combination on leads A, B and C is 100, a pulse appears at gate 302, while if the code combination is 110 for bits A, B and C, a pulse appears at gate 303. Once the A, B and C bits have enabled one of the logic gates, the output from that gate is converted to a weighted binary format at the seven output leads of digital weighter 203 shown in FIG. 3. Since the magnitudes of the code range from 2 to 24, only four of the seven output leads in digital weighter 203 are used. The leads are labeled 2, 4, 8 and 16, corresponding to the second, third, fourth and fifth positions in a binary number. A pulse on the lead labeled 2, for example, occupies the second position from the left in a binary number and therefore has a decimal weight of 2, while a pulse on the lead labeled 4 occupies the third position to the left in a binary number and therefore has a decimal weight of 4. As shown in FIG. 4, A, B and C bits of 110, respectively, correspond to a magnitude of 14. This magnitude is represented in a binary format with pulses occupying positions number 2, 3 and 4 counted from left to right in a binary number. Thus, in the digital weighter shown in FIG. 3, pulses must appear at outputs numbered 2, 4 and 8. To accomplish this, the 110 combination activates gate 303. The pulse at the output of gate 303 is then fed via conventional circuitry, indicated in FIG. 3 by OR gates 305, 306 and 307 to output leads labeled 2, 4 and 8. The sign bit, S, simply determines whether the magnitude 14 is positive or negative. By comparing the structure shown in FIG. 3 with the chart indicated in FIG. 4 it may be appreciated that each of the remaining connections from logic gates 301, 302, 303 and 304 produces the proper digital weight associated with each input code of A, B and C bits.

The output binary word from digital weighter 203 is fed through accumulator circuit 204 to digital-to-analog converter 205 as shown in FIG. 2. Accumulator circuit 204 is a conventional seven-bit accumulator which accumulates all positive and negative binary numbers from digital weighter 203. Since only the inputs labeled 2, 4, 8, 16 and S receive pulses from digital weighter 203, only these connections are necessary. The S bit essentially determines whether the input binary number is added or subtracted in seven bit accumulator circuit 204. Accumulating functions such as that produced by circuit 204 are well known in the art. One stage of such an addition and subtraction accumulator is shown in FIG. 1026 of Y. Chu, "Digital Computer Design Fundamentals." page 386 McGraw-Hill Book Co., Inc. (1962). Accumulator circuit 204 also contains conventional logic circuitry to prevent overflow and underflow discontinuities in the accumulating process. Digital-to-analog converter 205 at the output of an accumulator 204 converts the accumulated binary signal to analog form so that it may be subtracted from the input signal in subtractor circuit 201.

The four-bit code appearing at the output of sampler and quantizer circuit 202 is also transmitted via parallel-to-serial converter 206 and transmission path 207 to a distant receiver shown in FIG. 2. Parallel-to-serial converter 204 simply transforms the code appearing at outputs labeled A, B, C and S to a serial format in order that the signal may be transmitted via transmission path 207. It is understood, of course, that while the same code appearing at the output of sampler and quantizer 202 is utilized for transmission, other codes may be utilized by inserting a code translator in place of parallel-to-serial converter 204. Such code translators are well known in the art and may be used to transform the specific four-bit code to standard binary or other conventional codes. In the case where a code translator is used the four-bit code may be reduced to a three-bit standard binary format.

The transmitted pulse code from parallel-to-serial converter circuit 206 is received at input 208 of the receiver portion of the system shown in FIG. 2. The received signal is transferred by way of serial-to-parallel converter 209, digital weighter 210, accumulator 211 and digital-to-analog converter 212 to output 213. Serial-to-parallel converter 209 transforms the arriving serial pulse code a parallel format so that each group of bits, A, B C and S appears simultaneously on its four output leads shown in FIG. 2. Digital 210 receives each group of bits from serial-to-parallel converter 209 and performs an identical function to that of digital weighter 203 in the transmitter portion of the system. Each group of four bits is transformed to a seven-bit binary code in digital weighter 210 and passed to accumulator 211. Accumulator 211 maintains a continuous sum of the bits from digital weighter 210 in the same manner as accumulator 204 in the transmitter portion of the system. Both digital weighter 210 and accumulator 211 are identical apparatus to that described respectively for digital weighter 204 and accumulator 205 in the transmitter. Digital-to-analog converter 214, well known in the art, converts the accumulated seven-bit signal in accumulator 211 to analog form in order to reconstruct the original message wave.

In comparing FIGS. 1 and 2 it may be seen that integrator 103 which operates on the analog signal at the output of quantizer circuit 102 in FIG. 1 is replaced by digital apparatus 203, 204 and 205 which operates on the digital signal at the output of quantizer circuit 202. In the receiver portion of FIG. 1, analog integrator 108 follows digital-to-analog converter 107 while in the receiver portion of FIG. 2, digital weighter 210 and accumulator 211 precede digital-to-analog converter 212. Sampler and quantizer circuits 102 and 202 in FIGS. 1 and 2 are conventional circuits well known in the art. For simplicity sampler and quantizer 202 in FIG. 2 is shown producing the elemental four-bit code described above. A circuit similar in function to digital weighter 203, of course, could operate directly on the quantized analog signal at the output of circuit 102 to produce the weighted digital signal.

As indicated, the critical difference between the systems shown in FIGS. 1 and 2 is the digital accumulation process performed in FIG. 2. Because accumulator circuits 204 and 211 perform digital operations, they do not require precise components so that their functions are exceptionally easy to match. In addition, the summation process is performed by accumulator 211 in the receiver portion of FIG. 2 before the signal is converted to analog form in converter 212. Thus, unlike the system shown in FIG. 1, if one of the levels in converter 212 does not match the levels of the threshold device in quantizer circuit 202, the resultant error is not retained and summed to cause a streaking in the output signal.

In accordance with the invention, it should be noted that the feedback path shown in the transmitter portion of the system in FIG. 2 may also be used with sampler and quantizer circuit 102 and analog-to-digital converter 104 in the system shown in FIG. 1. In such a case, integrator circuit 103 is omitted and the code output of analog-to-digital converter 104 is weighted in a circuit corresponding in function to digital weighter 203. Such a digital weighter circuit may be constructed for the various codes that may be produced at the output of converter 104 by those skilled in the art in the same manner as that shown in FIG. 3 for digital weighter 203. The receiver portion of such a system would then contain a corresponding digital weighter circuit which converts the arriving code to a weighted binary code that may be accumulated in a circuit similar to accumulator 211 shown in FIG. 2. As may be appreciated, this variation of the present invention also contains the advantages described above.

Thus, as a consequence of the present invention the matching problem inherent in prior art differential pulse code communication systems is eliminated. While the system disclosed is composed of conventional circuitry which may take a variety of forms, it should be understood that the 201 embodiments are merely illustrative of the principles of the invention. Various modifications in differential pulse code subtractor systems in accordance with the principles of the invention may be effected by those skilled in the art without departing from the spirit and scope of the invention.

We claim

1. A differential pulse code communication system comprising:

a source of an analog message wave, means for producing a difference signal by subtracting a generated feedback signal from said message wave, means for quantizing said difference signal into a predetermined number of discrete levels, means for producing a first digital signal representative of the amplitudes of each of the levels of said quantized difference signal, accumulating means for accumulating the digits of said first digital signal, means connected to said accumulating means for producing said feedback signal by converting said accumulated digital signal to a corresponding analog signal, means for encoding and transmitting said quantized difference signal, means for receiving said transmitted difference signal, means for producing a second digital signal representative of the amplitudes of each of the levels of said transmitted difference signal, means for accumulating the digits of said second digital signal, and means for converting said accumulated digital signal to analog form in order to reconstruct said analog message wave at the receiver.

2. In a system for transmitting coded difference samples of a message wave, apparatus which comprises:

means for producing a difference signal by subtracting a general feedback signal from said message wave, means for quantizing said difference signal into a predetermined number of discrete levels, means for producing a digital signal representative of the amplitudes of each of the levels of said quantized difference signal, accumulating means for accumulating the digits of said digital signal, and means connected to said accumulating means for producing said feedback signal by converting said accumulated digital signal to a corresponding analog signal.

3. In a system for transmitting coded difference samples of a message wave, apparatus which comprises:

means for producing a difference signal by subtracting a generated feedback signal from said message wave, means for sampling said difference signal, means for dividing said sampled signal into a predetermined number of discrete signal levels, means for assigning a first digital code to each of the levels of said discrete signal, means for converting said first digital code to a second digital code representative of the amplitudes of said signal levels, means for accumulating the digits of said second digital code, and means for converting the accumulated signal to analog form in order to produce said feedback signal.

4. In a system for transmitting coded difference samples of a message wave, apparatus which comprises:

means for producing a difference signal by subtracting a generated feedback signal from said message wave, means for sampling said difference signal, means for dividing said sampled signal into a predetermined number of discrete signal levels, means responsive to each level of said sampled signal for producing a binary code having distinct groups of bits, each group of bits corresponding to a level of said sampled signal, a first bit in said group indicating the polarity of the level and the remainder of the bits in said group indicating the amplitude of the level, accumulating means for accumulating the groups of bits in said binary code, each of said groups being added digitally in said accumulating means when a positive level is indicated by said first bit, and each of said groups being subtracted digitally in said accumulating means when a negative level is indicated by said first bit, and means for converting the accumulated signal to analog form to produce said feedback signal 5. In a system for receiving coded difference samples of a message wave, apparatus which comprises:

means responsive to the coded difference samples for producing binary binary code having distinct groups of bits, each group of bits corresponding to the level of one of said samples, a first bit in said group indicating the polarity of the sample and the remainder of the bits in said group indicating the amplitude of the sample, accumulating means for accumulating the groups of bits in said binary code, each of said groups being added digitally in said accumulating means when a positive level is indicated by said first bit and each of said groups being subtracted digitally in said accumulating means when a negative level is indicated by said first bit, and means for converting said accumulated signal to analog form to reconstruct said message wave.